US010833524B2

(12) United States Patent
Tiainen

(10) Patent No.: US 10,833,524 B2
(45) Date of Patent: Nov. 10, 2020

(54) DISCONNECTING SUPPLY OF ELECTRIC CHARGING CURRENT

(71) Applicant: BRIGHTCHARGER EUROPE OY LTD, Kinkomaa (FI)

(72) Inventor: Harri Tiainen, Kinkomaa (FI)

(73) Assignee: BRIGHTCHARGER EUROPE OY LTD., Kinkomaa (FI)

( * ) Notice: Subject to any disclaimer, the term of this patent is extended or adjusted under 35 U.S.C. 154(b) by 644 days.

(21) Appl. No.: 15/514,208

(22) PCT Filed: Aug. 24, 2015

(86) PCT No.: PCT/FI2015/050544
§ 371 (c)(1),
(2) Date: Mar. 24, 2017

(87) PCT Pub. No.: WO2016/046447
PCT Pub. Date: Mar. 31, 2016

(65) Prior Publication Data
US 2017/0244269 A1   Aug. 24, 2017

(30) Foreign Application Priority Data

Sep. 26, 2014   (FI) ..................................... 20145843

(51) Int. Cl.
*H02J 7/02* (2016.01)
*H02J 7/00* (2006.01)

(52) U.S. Cl.
CPC   *H02J 7/02* (2013.01); *H02J 7/00* (2013.01); *H02J 7/0032* (2013.01);
(Continued)

(58) Field of Classification Search
CPC ........ H02J 7/022; H02J 7/0032; H02J 7/0042; H02J 7/0052; H02J 7/0044; H02J 2007/0059
(Continued)

(56) References Cited

U.S. PATENT DOCUMENTS 5,701,980 A * 12/1997  Lee ........................... B60L 1/04
                                                        191/4
6,229,287 B1 * 5/2001  Ferris ................... H02J 7/00711
                                                      320/141
(Continued)

FOREIGN PATENT DOCUMENTS

CN   201029210 Y   2/2008
CN   202353257 U   7/2012
(Continued)

OTHER PUBLICATIONS

European Patent Office; Abstract of CN202353257; Jul. 25, 2012; 1 page; Europe.
(Continued)

*Primary Examiner* — M Baye Diao
(74) *Attorney, Agent, or Firm* — Greenberg Traurig, LLP

(57) ABSTRACT

In an embodiment, disconnecting a supply of an electrical charging is described. In an embodiment, a device comprises: a reception configured to receive an electric current. A supply configured to supply an electric current out from the device in a connection with charging a battery of an electrical device. Connectors configured to connect the device between a power unit, which supplies the electric current to the reception,and the electrical device. A switch configured to disconnect at least one of the electrical currents. A control unit configured to control the switch, wherein the control unit comprises a timer configured to control the switch according to a predetermined timing function. A housing, wherein a movement of the housing is
(Continued)

configured to generate a stimulus that is configured to the switch for connecting the at least one of the electrical currents and reset the timer.

17 Claims, 5 Drawing Sheets

(52) U.S. Cl.
CPC .......... *H02J 7/0042* (2013.01); *H02J 7/0044* (2013.01); *H02J 2207/20* (2020.01)

(58) Field of Classification Search
USPC ........................................................ 320/111
See application file for complete search history.

(56) References Cited

U.S. PATENT DOCUMENTS

| | | | | |
|---|---|---|---|---|
| 6,866,527 | B2* | 3/2005 | Potega | H01R 24/58 439/218 |
| 8,237,414 | B1* | 8/2012 | Li | H02J 7/0003 320/160 |
| 8,712,482 | B2* | 4/2014 | Sorias | H02J 7/0042 455/572 |
| D708,131 | S | 7/2014 | Miller et al. | |
| 8,841,798 | B2* | 9/2014 | Tuukkanen | H02J 9/00 307/66 |
| 8,975,862 | B2* | 3/2015 | Asakura | H02J 7/0068 320/109 |
| 9,018,904 | B2* | 4/2015 | Seyerle | B60R 16/033 320/113 |
| 9,325,516 | B2* | 4/2016 | Pera | H04B 3/54 |
| 9,728,994 | B2* | 8/2017 | Osswald | H02J 7/0069 |
| 10,069,315 | B2* | 9/2018 | Johnson | H02J 7/007 |
| 10,116,172 | B2* | 10/2018 | Fischer | H02J 7/04 |
| 10,177,576 | B2* | 1/2019 | Huang | H02J 7/0072 |
| 2005/0285560 | A1* | 12/2005 | Glasgow | H02J 7/0042 320/111 |
| 2006/0220613 | A1* | 10/2006 | Abe | A61B 1/00034 320/114 |
| 2009/0096413 | A1* | 4/2009 | Partovi | H01F 38/14 320/108 |
| 2011/0148344 | A1* | 6/2011 | Manor | H02J 7/0068 320/103 |
| 2012/0081071 | A1* | 4/2012 | Asakura | H02J 7/0068 320/109 |
| 2012/0169290 | A1* | 7/2012 | Nakashima | H02J 7/0021 320/134 |
| 2012/0235641 | A1* | 9/2012 | Yang | H02J 7/0068 320/110 |
| 2013/0043827 | A1 | 2/2013 | Weinstein et al. | |
| 2013/0193911 | A1 | 8/2013 | Miller et al. | |
| 2014/0042969 | A1 | 2/2014 | Miller et al. | |
| 2014/0152257 | A1 | 6/2014 | Miller et al. | |
| 2014/0176071 | A1 | 6/2014 | Alammari | |
| 2016/0368390 | A1* | 12/2016 | Yang | B60L 1/003 |

FOREIGN PATENT DOCUMENTS

| | | |
|---|---|---|
| EP | 2264854 A1 | 12/2010 |
| GB | 2458537 A | 9/2009 |
| GB | 2448330 B | 6/2010 |
| WO | 2016046447 A1 | 3/2016 |

OTHER PUBLICATIONS

European Patent Office; PCT International Preliminary Report on Patentability, Issued in connection to PCT/FI2015/050544; dated Jan. 10, 2017; 8 pages; Europe.

European Patent Office; PCT International Search Report, Issued in connection to PCT/FI2015/050544; dated Oct. 23, 2015; 2 pages; Europe.

* cited by examiner

DISCONNECTING SUPPLY OF ELECTRIC CHARGING CURRENT

BACKGROUND

In recent decades, the number of different kinds of chargeable devices that are powered by electric current has grown enormously, and a single household may have for example 2-10 chargeable battery-operated devices. Such devices include for instance mobile phones, electric toothbrushes and tablets. The devices may be charged on a continuing basis when stowed away, or when the battery needs to be charged. For example, in the case of mobile phones and tablets, charging may be repeated for example once a day or every other day. From the user's perspective, it requires effort to repeatedly monitor the filling or the charge percentage of the battery of a chargeable device, due to which the device may be charged for a considerably longer time than required to charge the battery full.

In general, chargers are able to switch from using the charging current to the use of standby current, when the battery of a chargeable device becomes full. Although the standby current is considerably lower than charging current, on an annual level it still leads to significant electricity consumption. The charger also consumes current when left connected to the mains current, even if the charger was not connected to a chargeable device. This electricity consumption is completely useless and wasted energy. Scaling the problem up to a global level, electricity may be wasted by chargers to an extent that equals the production of several nuclear power plants. Furthermore, the standby current supplied by chargers to a chargeable device destroys or weakens the capacity of the battery of the chargeable device, speeding up the decrease of capacity of the battery. The batteries may have a certain life span of an available overall charging time.

In the prior art, document CN202353257U has been disclosed, describing a mobile phone charger with an integrated time switch. This solution allows disconnection of electric current supplied by the charger to the chargeable device after a desired charging time. The charger itself remains powered, whereby it consumes electricity every time it is connected to the mains current.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, disconnecting a supply of an electrical charging is described. In an embodiment, a device comprises: a reception configured to receive an electric current. A supply configured to supply an electric current out from the device in a connection with charging a battery of an electrical device. Connectors configured to connect the device between a power unit, which supplies the electric current to the reception, and the electrical device. A switch configured to disconnect at least one of the electrical currents. A control unit configured to control the switch, wherein the control unit comprises a timer configured to control the switch according to a predetermined timing function. A housing, wherein a movement of the housing is configured to generate a stimulus that is configured to the switch for connecting the at least one of the electrical currents and reset the timer.

In an embodiment, a device comprises: A reception configured to receive an electric current. A supply configured to supply an electric current out from the device in a connection with charging a battery of an electrical device. Connectors configured to connect the device between a power unit, which supplies the electric current to the reception, and the electrical device. A switch configured to disconnect at least one of the electrical currents. A control unit configured to control the switch, wherein the control unit comprises a timer configured to control the switch according to a predetermined timing function set by a manufacturer of the device. A housing, which is configured transparent at least over a portion of the housing. An illumination device configured to illuminate the housing, wherein control unit is configured to control the illumination device for illuminating the housing on a basis of the predetermined timing function.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 3 shows a schematic circuit diagram for the embodiment of the device as illustrated in FIG. 1a;

Like numerical references are used to designate like parts in the accompanying drawings.

DETAILED DESCRIPTION

Figure 1A:
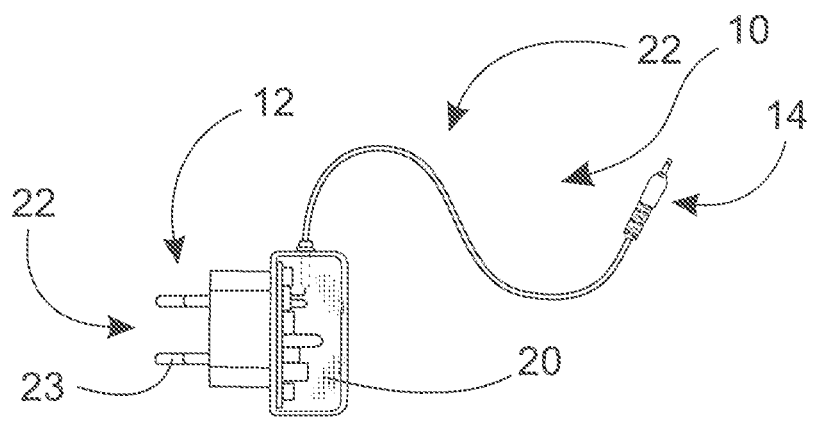
FIG. 1a shows an embodiment of the device as a side view.

The detailed description provided below in connection with the appended drawings is intended as a description of the present embodiments and is not intended to represent the only forms in which the present embodiment may be constructed or utilized. However, the same or equivalent functions and sequences may be accomplished by different embodiments.

Although the present embodiments may be described and illustrated herein as being implemented in a smartphone or a mobile phone and a respective charger, these are only examples of an electrical device having a battery to be charged by a charger, and not a limitation. As those skilled in the art will appreciate, the present embodiments are suitable for application in a variety of different types of battery operated devices that require charging, for example, in tablets, phablets, computers, cameras, game consoles, laptop computers, domestic electrical devices, electrical toothbrushes, vacuum cleaners with battery, etc.

According to an embodiment, a charger having design housing may be provided, which automatically cuts off the electric current after a specified time. Consequently, there may not be a worry about forgetting to unplug your mobile or other battery powered electronic devices, for example for the night. The device to be charged, for example a mobile device, stops charging and, the charger device stops drawing power from the outlet automatically. According to an embodiment, after this the device may function as a soft and safe LED night light, which drains only a small fraction of the power that a normal charger does. According to an embodiment, the LED light may be disabled completely, so that there is no power consumption, after the timer has elapsed.

A movement of the device may be configured to generate a stimulus that is configured to start the electrical current reception from the power unit, such as the mains, and reset the timer. Consequently, a mechanical movement generates energy to wake up the charging device. A difference to a known button, for example a push, pull or horizontal switch button, is the movement of the device itself. For example, a housing of the device may be displaced to generate the stimulus. According to an embodiment the whole device is moved. According to an embodiment a part of the housing of the device may be moved. For example, the housing and/or the device may be pushed or pulled for a certain amount. For another example, the housing and/or the device may be turned or twisted. After being displaced, the housing or the device may return to the initial position, for example by a returning force such as a spring etc. Even furthermore, the housing and/or the device may be touched, and the touch generates the stimulus. Also the housing or the device may be inserted into a certain position or location to generate the stimulus.

According to the embodiment, a device for disconnecting the supply of electric current in connection with charging a battery of an electrical device, specifically a mobile device, is described. The device comprising a reception for receiving electric current, a supply for supplying electric current out from the device, and a switch for disconnecting the supply of electric current to the supply. The device further comprises a control unit for controlling the switch and connectors for connecting the device between a mains unit that supplies electric current and a unit that is powered by electric current. The control unit may be a timer for controlling the switch with a preselected timing function. The device further comprises a mains switch for disconnecting the supply of electric current being supplied to the device after the receptions, for example before the device components that consume electric current. By the timer, the electric current being supplied to the chargeable device is disconnected automatically when the charging period has ended and, by the mains switch, the mains current being supplied to the device is disconnected to make the internal electricity consumption of the device nil. For example, all device components maybe without current at this point. The embodiment of the device may prevent internal current consumption and battery-consuming overcharging of the chargeable device.

Any of the electrical current may be switched off. For example, the current of the power reception, such as 230 AC main power, or the current of charging supply, such as the low voltage DC.

According to an embodiment, the timer is arranged so that the single preselected timing function is a selected fixed period of time which is selected from between, for example 0.1 h-4 h, depending on a typical charging cycle, which may be required for charging the battery to a desired condition. According to an embodiment this may be 0.5-3 h, preferably 1-2 h. This may be a common charging time required by devices and, as it is preset, the user is able to use the device without having to separately adjust the timer settings. On the other hand, this charging time is short enough to have current supplied to a full battery only to a small degree or not at all. One example of the selected period of time could be two hours. Certain chargers and certain batteries may be charged to the desired stage faster, while others may require longer period of time. The charge period may be predetermined time, which is set by a manufacturer of the device.

The device may comprise opening device for opening the mains switch based on the position of the switch. In this case, the filling of the battery of the chargeable device disconnects, by the switch, the supply of the electric current to the chargeable device and, due to the control based on the position of the switch, also the supply of electric current to the device itself.

The device may comprise closing device for closing the mains switch for starting the current supply. By the closing device, the mains switch can be closed again so as to execute a new charging period with the device.

According to an embodiment, the closing device is a mechanical closing device. With mechanical closing device, the closing of the mains switch is based on a movement by the user, for example in connection with causing the movement of the housing of the device, thereby pressing a contact switch or a button or in connection with inserting the device into a socket. The mechanical closing device may also operate without the electric current.

According to an embodiment, the closing device is magnetic closing device. By magnetic closing device, the mains switch can be closed for example by bringing the chargeable device in proximity to the device.

According to an embodiment, the closing device is capacitive closing device. By capacitive closing device, the mains switch can be closed for example by bringing the chargeable device in proximity to the device, so that the chargeable device induces an electric current in the closing device of the device.

The control unit may comprise measuring device for measuring the electric current supplied by the supply and for operating the switch when the supplied electric current falls below a preselected threshold value. Due to the measuring device, it is possible to accurately judge when the chargeable battery is full and to disconnect the current supply from the device to the chargeable unit. According to an embodiment, a wire, for example in addition to the current feeding wires, may be connected between the device and the battery for the measuring device.

The device may comprise timing function stopping device for changing the preselected timing function automatically based on the measurement data from the measuring device. According to an embodiment the timer can be bypassed by the timing function stopping device, for example so that the battery may be charged based on the measured degree of energy. For example, should the measuring device measure that the battery of the chargeable device is only half-charged when the preselected timing function is approaching its end, the stopping device can automatically stop the timer for a moment until the chargeable device has a sufficiently high battery charge. For another example, should the measuring device detect that the battery is full or nearly full, and the preselected timing function still having running time, the stopping device can automatically bypass the timer and stop the charging. The function of the stopping device has no effect on the user experience of using the device just by connecting the device to the chargeable device, to a charger or to a socket, without having to select any options. According to an embodiment, a controller relating to the battery may output information to the charging device, and charging device receives it. Based on the information, the timing stopping device may bypass the timer and stop charging.

According to an embodiment, the device comprises a housing for housing at least the switch and the control unit and, by using illuminating device placed within the housing, the housing can be made to shine a light at least when charging is on. The device may be thus very simple and easy to use.

The illuminating device may comprise just one LED for indicating a different charge. The LEDs consume very little current in operation and are therefore very economical.

The switch may be arranged to control the current circuits with its position. When the position of the switch changes, it changes the color of the light produced by the illuminating device so that the user is able to conclude that the charge is full, if one of the lamps is implemented so as to use for example the energy left in the capacitive device.

According to an embodiment, the control unit is a timer for controlling the switch with a preselected timing function. The timer disconnects current supply to the chargeable device after a preset charging time, so the battery will not be consumed with standby current.

The device may comprise wireless data transfer device for receiving remote control commands. This way, the device can be controlled for example with an application on another mobile device or the control unit can be programmed with an application.

According to an embodiment, the device comprises converting device for converting the alternating electric current received by the reception into direct current. Thus, the device basically functions as a self-contained charger.

The device may comprise sound reproduction device for producing an alarm tone for the user based on the position of the switch. This makes it is easy for the user to recognize that the battery of the chargeable device is full.

According to an embodiment, a charger is integrated with the device. The charger and the device according to the embodiment thus constitute a single and compact device.

The device may comprise a detector for identifying successive operating times and for controlling the illuminating device on that basis. Even though the preset charging time of the device was 2 h, the device may at some point be disconnected from current and replaced for charging, in which case the total charging is 4 h. During the second 2 h charging period, a different light may be on than during the first one, indicating a following charging period to the user.

An embodiment may provide a device that is easier to use than the prior art devices for disconnecting the supply of mains current in connection with charging an electrical device to prevent the internal electricity consumption of the device outside the charging periods when the device is physically connected to a unit that supplies electric current, wherein the device stops the current supply to the chargeable device automatically.

An embodiment may relate to an affordable and simple accessory in connection with charging a chargeable device for enhancing the duration of a battery of a mobile device and for preventing unnecessary electric current consumption of the charger in an easy way. When using the device, the user may not select any options; instead, the device includes a timer with a single preselected timing function. Thus, the device is easy to use without unnecessary options to be selected, and it shows when the charging is complete with the color of the indicator. The device may be designed for use with devices provided with a battery.

The device is easy and convenient to switch on/powered for charging, after the charging period has been terminated.

Figure 1B:
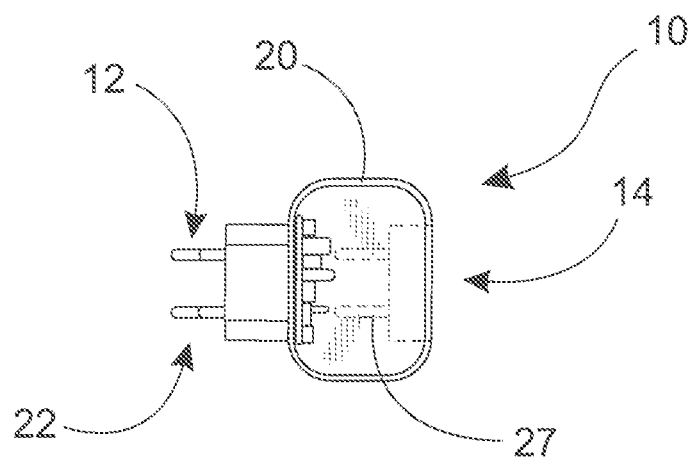
FIG. 1b shows another embodiment of the device as a side view.
Figure 2A:
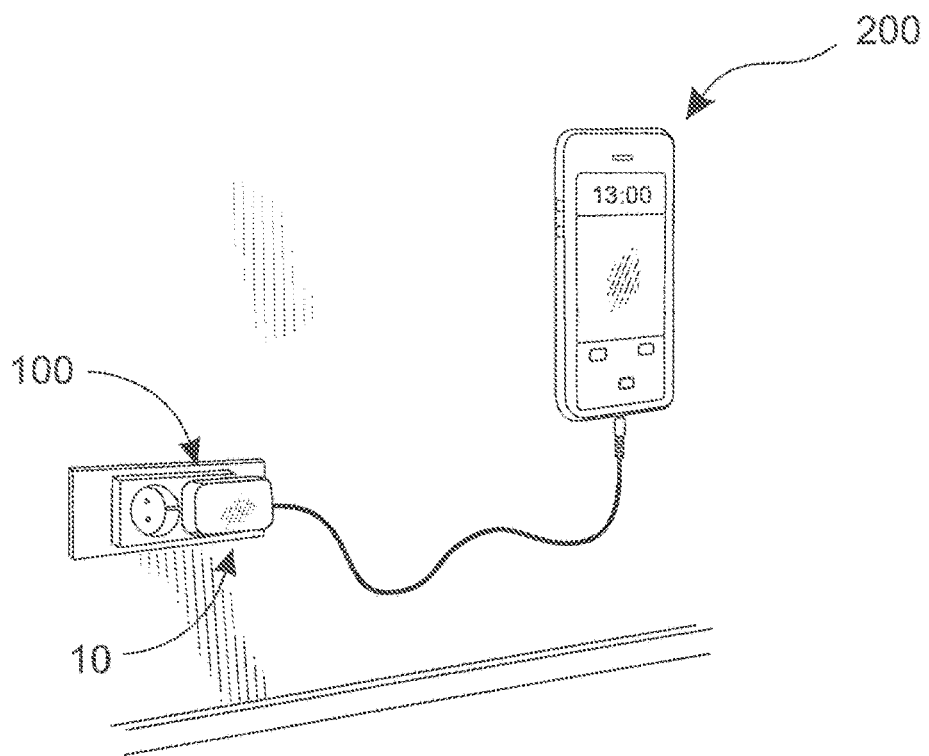
FIG. 2a shows an axonometric view of the embodiment according to FIG. 1a in use.
Figure 2B:
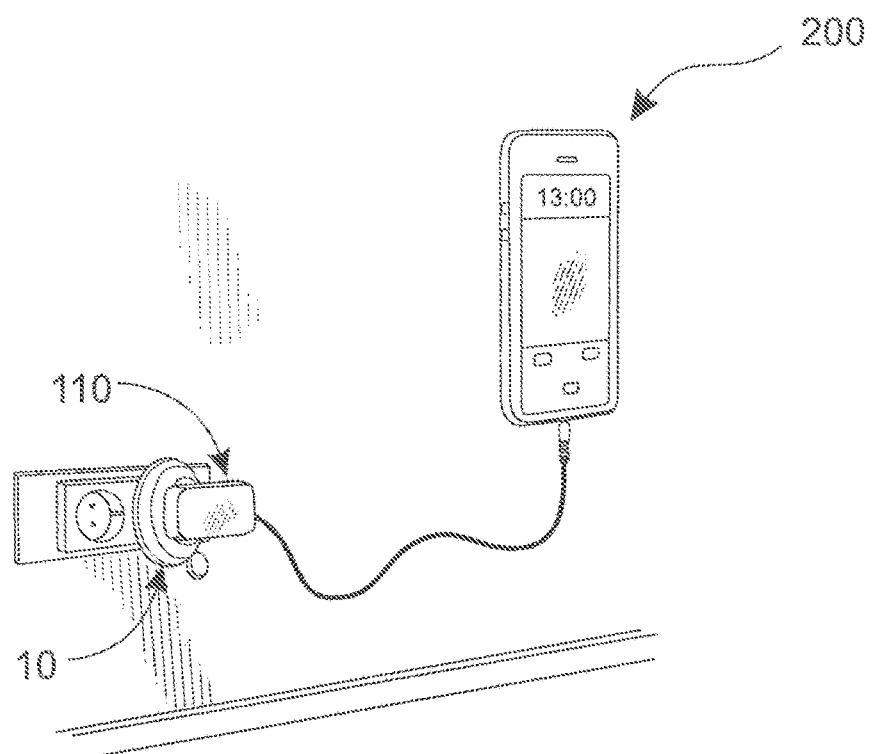
FIG. 2b shows an axonometric view of the embodiment according to FIG. 1b in use.

Referring to FIGS. 1a and 1b, the device 10 may be implemented as many different embodiments. In FIG. 1a, the device 10 is implemented as integrated with a charger. However, in FIG. 1b the device 10 is implemented as an adapter used by connecting it to a socket. As shown in FIG. 2a, the device 10 of FIG. 1a can be used for example as a smart phone charger connected to a socket that functions as a unit 100 that supplies current for charging a unit 200 that is powered by current, for example a smart phone in this case, for a preselected time or until the battery of the unit that is powered by current becomes full. As shown in FIG. 2b, the device 10 according to FIG. 1b can be used between a unit 100 that supplies current, for example a socket in this case, and a charger 110, from which charger the current is conveyed to a unit 200 that is powered by current, for example a smart phone. An embodiment of the device may be simply a circuit to be installed as an accessory on complete charging units.

With reference to FIG. 1a-4, the device comprises a reception 12 for receiving electric current, a supply 14 for supplying electric current out from the device 10, and a switch 16 for disconnecting the supply of electric current to the supply 14. The device 10 also comprises a control unit 18 for controlling the switch 16, which is a timer for controlling the switch 16 with only one preselected timing function. The device 10 further comprises connectors 22 for connecting the device 10 between a unit 100 that supplies electric current and a unit 200 that is powered by electric current. The device may also comprise a mains switch 50 for disconnecting the supply of electric current being supplied to the device 10 immediately after the reception 12. Any of the switches 50 or 16 may be disconnected by the control unit 18.

Figure 3:
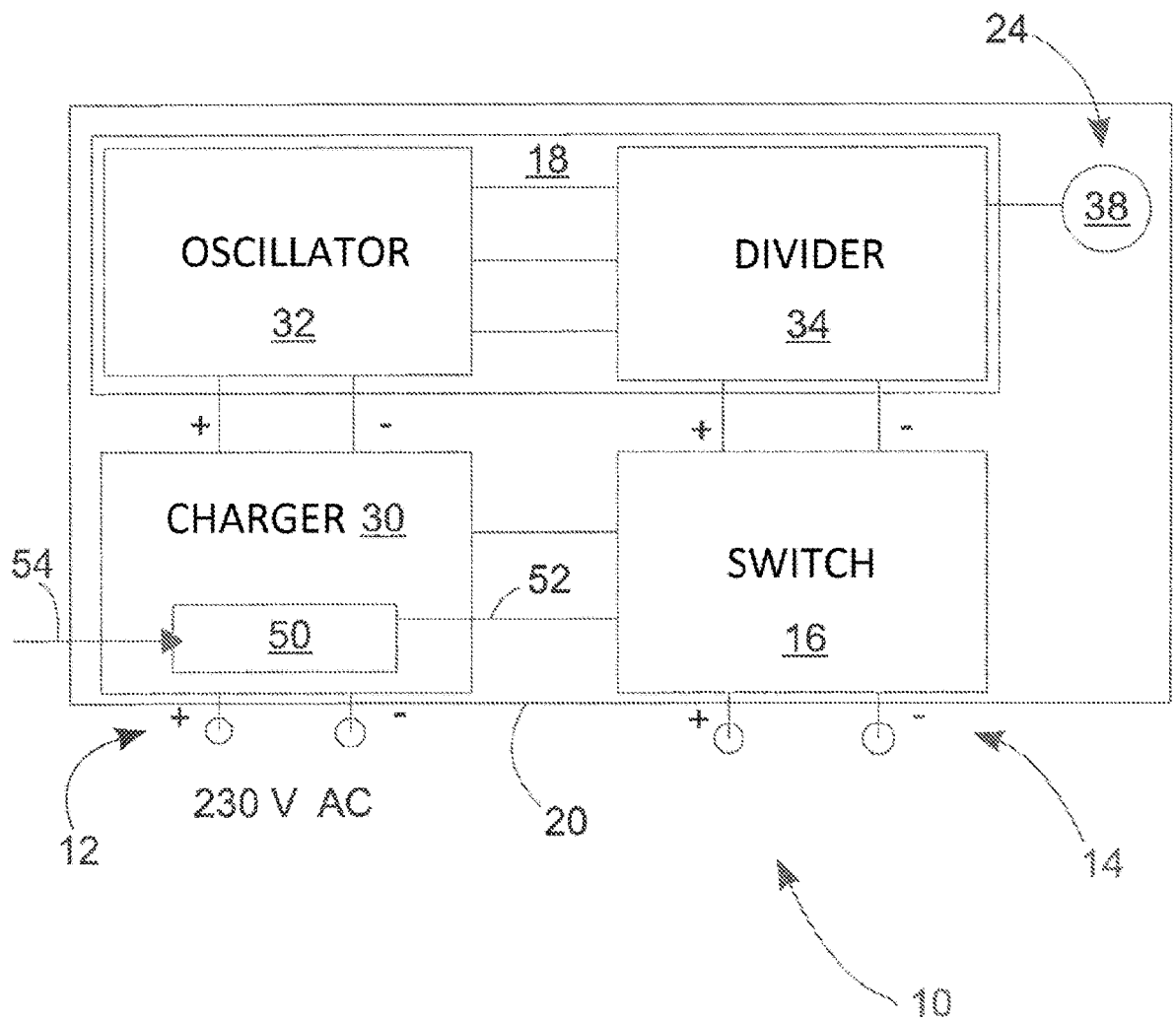
Figure 4:
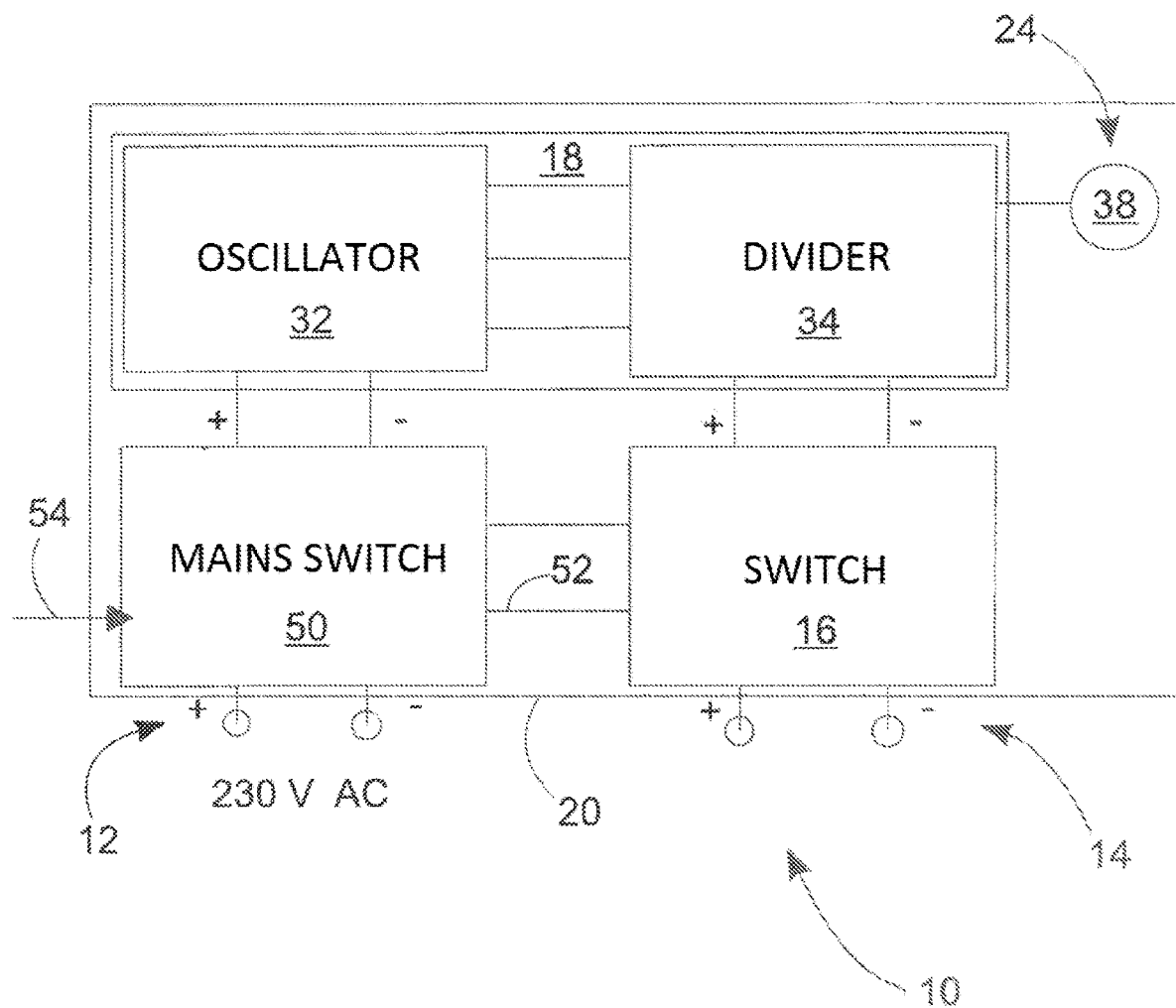
FIG. 4 shows a schematic circuit diagram for the embodiment of the device as illustrated in FIG. 1b.

FIG. 3 illustrates a schematic circuit diagram for the device according to an embodiment. According to FIG. 3, the electric current is supplied to the reception 12 of the device 10. According to an embodiment, the reception 12 is arranged to receive electric current as alternating current or direct current, depending on the embodiment. In the embodiment of FIG. 3, the device 10 is implemented as shown in FIG. 1a or 1b, i.e. to be connected directly to a socket, whereby alternating current of a voltage of 110 or 230 V is supplied to the device 10. In the embodiment of FIG. 3, the device 10 itself comprises a charger 30 including electric current converting means so as to convert the alternating current of a higher voltage into direct current of a lower voltage that is suitable for charging batteries as in the prior art. The voltage of the direct current may be for example 5, 9 or 12 V, which is the normally used voltage in mobile devices. The charger may be a device that is completely equivalent to typical chargers in terms of its components. The voltage output of the charger gives the operating voltage to the control unit, the operating voltage being interrupted by the switch 16 when the charging time has ended. It should be appreciated that the charger is not a necessary part of the device, but may also be a typical charger 110 that is separate from the device and connected to the device 10 as shown in FIG. 1b.

The converted direct current is conveyed through the control unit 18 and the switch 16 to the supply 14 for supplying direct current to the unit that is powered by electric current. The purpose of the switch 16 is to disconnect the current supply to the supply 14 when the control unit 18 gives the switch 16 a command to change position. The switch 16 may be for example a semiconductor such as a transistor or a similar component that works as a switch.

As shown in FIG. 3, the control unit 18 may be a timer which the components oscillator 32 and divider 34 form together. The frequency produced by the oscillator 34 is successively divided for a number of times that equals a single timing function that is preset in the timer, for example two hours. According to an embodiment, the device 10 may include only one pre-set time for the timing function used by the device 10 when connected to a socket. In this embodiment, the current is not measured at any point; the path of the charging current just goes in this case through different units as compared to the prior art chargers, giving at the same time the operating voltage they need. The microcircuit of the oscillator 32 may also include gate circuits for controlling an LED 38 and the switch 16. A green or red led may be on for the duration of the timing function (e.g. for 2 hours). The timer provides a preset timing function for the current supply of the device 10. The preset timing function may be arranged to keep the switch in a closed position for a selected time, the time being preselected from between 0.1-4 h, for example 1-2 h. This is a time normally sufficient to charge empty batteries of most mobile devices until full.

The device 10 may also comprise an illuminating device 24 arranged to illuminate the housing 20 with at least one light according to the position of the switch 16. When the switch 16 is disposed in a closed position, for example when electric current is supplied to the supply means 14, the illuminating device 24 is preferably arranged to produce for example green or red light. The illuminating device 24 may comprise one or more LEDs 38. The materials of which the LED is manufactured dictate the wavelength of the light produced by the LED, for example its color. For example, a white LED, a red LED ($\lambda$=610-760 nm) and/or a green LED ($\lambda$=500-570 nm) may be used in the device 10. When the device is on, electric current is conveyed to the LED 38 so as to indicate that charging is in process. The illuminating unit may also comprise several LEDs for indicating for example the progress of charging or successive charging periods. LEDs may be used in the device 10, as they have a long lifetime (for example 10000-100000 h) and a very low current consumption (for example less than 20 mA).

According to one embodiment, the green or red LED 38 goes out at the end of the charging time (timing function), any of the switches being opened and disconnecting the device 10 from the current. At the same time, the divider 34 prompts the switch 16 to assume an open state, and information is provided from the divider 34 to the oscillator 32, which stops and remains in that state as the mains switch 50 is opened. The divider 34 provides the control for the LED using gates of the gate circuit of the oscillator 32. When the device 10 is reconnected to the mains electricity, the increase of voltage provides a reset pulse for the divider 34, due to which the divider 34 is cleared, the oscillator 32 is activated, the LED 38 turns on, and so starts a new timing function. The timing function may be operational even if the chargeable device was not wired. Instead of the illuminating device, the device 10 may also have another indicator showing that charging is in process, such as a mechanical indicator.

When the timing function has come to its end, the opening means 52 open the mains switch 50 connected to the device 10, for example immediately, after the reception means 12 based on the position of the switch 16, whereby the current supply to the device 10 stops completely. In addition, current consumption has stopped in the powered unit, for example the chargeable device, when the position of the switch has changed. The LED may be connected with the mains switch so as to receive the current it needs even when the mains switch is disposed in its open position, while the other device components remain without current. For example, a white LED light maybe provided for a night light. However, this is according to an embodiment only in terms of current saving. If a charger is integrated with the device 10, the internal consumption thereof ends. In the case according to FIG. 3, the mains switch 50 is integrated with the charger 30 that is part of the device 10, this case corresponding to the case according to FIGS. 1a and 2a. However, in the case according to FIG. 4 the mains switch 50 is a separate component disposed in the device immediately after the current reception means 12 before the control unit. This case corresponds to that of FIGS. 1b and 2b where the charger is attached as a separate unit at the back of the device according to the invention before the chargeable device. According to an embodiment the device 10 may also be an integral part of any charging unit, such as a toothbrush charger, a laptop computer charger or other such device. In this case, the device 10 is simply a circuit board integrated with the desired charging unit. The circuit board may be attached or embedded as such to a ready charger with relatively minor modifications. The housing of the charger may be replaced. Consequently, the circuit board can be manufactured to various different charger devices.

When the device 10 is completely without current, a closing device 54 maybe used for restarting the device 10, for example, for closing the mains switch 50 or the switch 16, to allow the current to flow once again to the control unit of the device 10 and thereby to the chargeable device. A movement of the device 10 may be configured to generate a stimulus that is configured to start the electrical current reception from the power unit and reset the timer. Consequently, a mechanical movement generates energy to wake up the charging device 10. A difference to a known button, for example a push, pull or horizontal switch button, is the movement of the device 10 itself. For example, a housing 20 of the device 10 maybe displaced to generate the stimulus. According to an embodiment the whole device 10 is moved. According to an embodiment a part of the housing 20 of the device 10 may be moved.

Figure 5A:
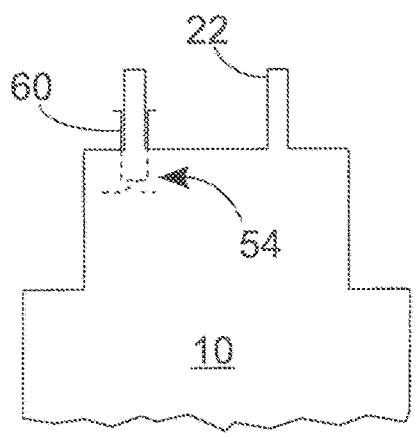
FIGS. 5a-5e show schematic illustrations of different embodiments of the closing device of the switch.
Figure 5B:
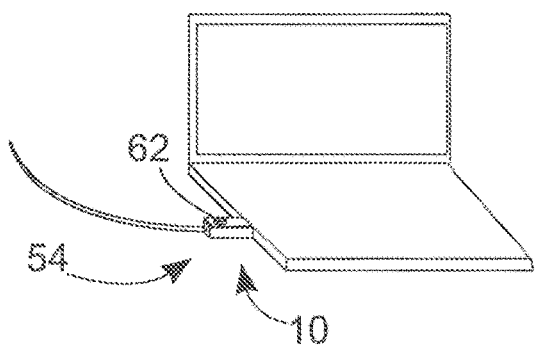
Figure 5C:
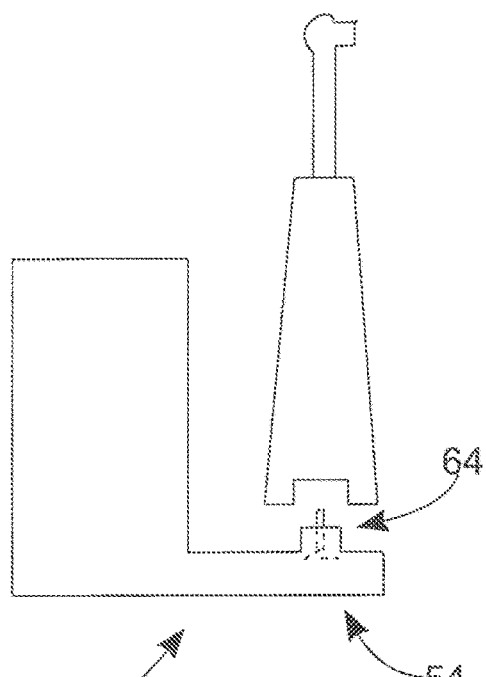
Figure 5D:
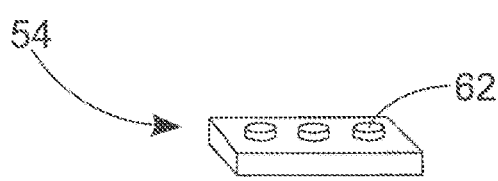
Figure 5E:
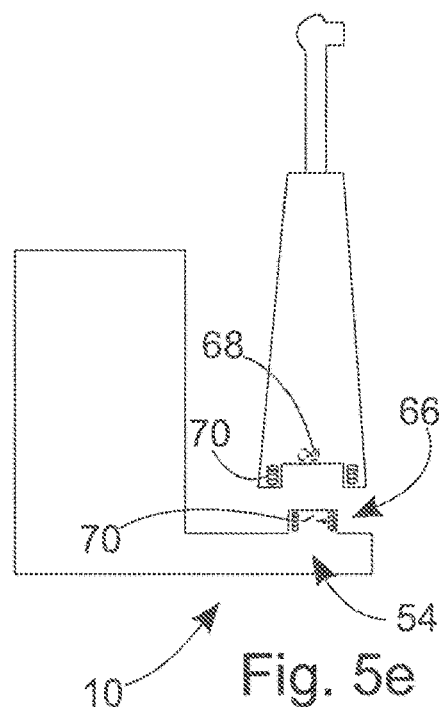

The closing device 54 can be implemented in many different ways and some embodiments are described in FIGS. 5a-5e. An embodiment relates to a mechanical closing device of FIGS. 5a-5d as the closing means. FIG. 5a illustrates a press switch 60 that closes any of the switches 16,50, when the device 10 is being connected to a socket. FIG. 5b illustrates a press button 62 which is pressed by the housing 20 caused by the user to reactivate a charging period of a charger by closing the switch 16,50. FIG. 5c illustrates another press switch 64 that is depressed, for example, due to the weight of an electric toothbrush so as to close the switch 16,50. A further example of mechanical closing device 54 is a method as shown in FIG. 5d, known as POWERKISS, where pressure on an external switch connected to the switch 16,50 in a separate device closes the switch 16,50 to start the current supply to the control unit 18 of the device 10. Another embodiment is to use magnetic closing device as illustrated in FIG. 5e as the closing device 54. This can be particularly useful, for example, with electric toothbrushes, at the base of which a small magnet 68 can be attached so as to close the switch 16,50 based on magnetism. As an embodiment, it is also possible to use capacitive closing device 66 illustrated in FIG. 5e, which induce a voltage in the coils 70 through movement of the chargeable device and thus provide a small electric current for the closing device 54 for closing the switch 16,50.

According to an embodiment, the control unit 18 may comprise measuring device for measuring the electric current supplied by the supply and for operating the switch when the supplied electric current falls below a preselected threshold value. In this case, the electric current supplied by the supply to the chargeable device that is powered by electric current is measured continuously or at specific intervals, and when the amount of the supplied electric current is reduced as the battery is being filled up, the control unit prompts the switch to assume its open position, so as to prevent the supply of electric current to the chargeable device that is powered by electric current, for example a smartphone, via the supply. The preselected threshold value may be for example $I<0.05*I_{max}$. By measuring the electric current, the filling up of the battery can be recognized and the supply of electric current disconnected, so the battery will not be consumed with standby current.

According to an embodiment, the device 10 may also comprise timing function stopping device for stopping the progress of the preselected timing function of the timer on the basis of measurement data from the measuring device if the battery is still far from full when the end of the time period of the preselected timing function is approaching. The threshold value may be for example a battery charge of less than 60% when less than 5% of the time period of the preselected timing function is left. If this is the case, the timer can be stopped for example for 10 minutes, and after that the charge is measured again and the timer is restarted or kept stopped for another 10 minutes, until the charge is sufficient to continue the timing function.

The electric current reception 12 and supply 14 are provided with connectors 22 for connecting the device 10 to a mains power that supplies electric current and to a chargeable device that is powered by electric current. On the side of the reception 12, the connectors 22 can be for example male-type conductors 23 for insertion into a socket as shown in FIGS. 1*a* and 1*b*. On the supply side, the connectors can be female conductor holes 27 for insertion of a plug therein as shown in FIG. 1*b*, or for example a female USB connector. The connectors 22 can be for example normal mobile phone charger connectors, USB connectors, mini HDMI connectors, micro USB connectors or other such connectors. In addition, the connectors 22 can be connectors that are fitted for a cigarette lighter of a car or for other current supply of 12V or 24V. According to an embodiment, the connectors may be changed. For example, to meet different requirements of mains power in various countries. For another example, to meet different requirements of the chargeable device.

When using a timer provided with a single preset timing function as the control unit 18, a current supply of, for example, 2 h may be too short a time for some units that are powered by electric current to charge the battery full, unless the device 10 comprises the timing function stopping device as described above. In this case, the device 10 can be disconnected from current supply for a moment and reconnected to current supply to charge for yet another 2 h after the first charging period. Preferably, the device 10 may comprise a detector for recognizing such conditions, in which case, when the switch is disposed in the closed position, a different LED is used to produce light of a completely different color than at any point of the first charging period. For this purpose, the device 10 may comprise a light switch for switching the current supply from one LED to another in successive charging periods.

According to one embodiment, the device 10 may comprise wireless data transfer device for receiving remote control commands. Such wireless data transfer device can be for example a unit which uses bluetooth or WIFI and which is able to set for example the preselected timing function, for example the duration of the switch being disposed in the closed position, on the control unit based on remote control. In this case, it is possible to set the timing function for example by a smartphone or a tablet using an application designed for this purpose.

According to one embodiment, the device may comprise sound reproduction device for producing an alarm tone for the user based on the position of the switch. The sound reproduction device can be connected in parallel with the LED of the illuminating device and controlled by the control unit 18. This could be a beep or a similar sound preferably produced by the device right before the position of the switch changes, so that the user will recognize that charging is complete. When connected with wireless data transfer device, the user could also search the device by activating the alarm tone by a smartphone or a similar mobile device. By the aid of the sound, people with restricted eye sight, for example a blind person, may recognize that the charging timer has ended.

The housing 20 of the device may be at least partially transparent at least over some of its surface area can be made, for example, from transparent clear plastic, glass or similar material. The housing 20 can be partially or entirely transparent, so that the LED within the housing 20 illuminates the transparent portion of the housing, indicating the charging status to the user. The light also makes it easier to find the device in dark. If the device is implemented as the embodiment according to the figure, the cable between the connectors 22 and the chargeable device can also be made from transparent material, inside which for example optical fiber and the necessary conductors are fitted. In this case, the optical fiber illuminates the cable jacket throughout its length.

According to an embodiment, the housing 20 may be detachable. The housing 20 can be replaced by a different housing, and the device remains unchanged. For example, there may be different kinds of design, shapes and illumination characteristics for different kind of housings. For example, a football, a logo of a company, wherein the logo letter may be illuminated only, etc. According to an embodiment, the housing 20 may be a part of general design, for example a part of the room, wherein the charging device is typically located. It may be a part of a decoration of the room, or a part of a brand. According to an embodiment, the device 10 comprises a battery (not shown in the figures) within the housing 20. In case of a power failure in the mains power, the battery may be used to power the illumination device 24. For example, the night light may be on, even in case of the power failures.

According to an embodiment, the device 10 comprises three general parts: the connector 22 to the main power, which may be changeable depending on the standards, a body comprising the charging and control electronics, and housing 20. The connectors 22 and the housing 20 may be detachable and changeable with respect to the body.

The functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Alternatively, or in addition, the functionalities described herein may be operated by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage medium, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought, or without extending beyond the disclosure.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device integrated with a charger, comprising:
   a reception of mains electricity configured to directly receive an electric current of mains electricity; wherein the device includes the reception so that the reception is part of the device;
   a supply configured to supply an electric current of the supply out from the device, wherein the electric current of the supply is configured for charging a battery of an electrical device;
   connectors configured to connect the device between a power unit of the mains electricity, which supplies the electric current of the main electricity to the reception and the device being directly connected to the mains electricity, and the electrical device, wherein the device includes the connectors so that the connectors are part of the device;
   a switch configured to disconnect the electric current of the mains electricity;
   a control unit configured to control the switch, wherein the control unit comprises a timer configured to control the switch according to a predetermined timing function and automatically disconnect the electric current of the mains electricity so that the battery of the electrical device is not charged when the electrical device is connected to the supply; and
   a housing, wherein a movement of the housing is configured to generate a stimulus that is configured to the switch for connecting at least one of the electric current of the mains electricity and the electric current of the supply and start the electrical current of mains electricity reception from the mains electricity, and reset the timer.

2. The device of claim 1, wherein the switch is configured to disconnect the electrical current of the supply, and based on the stimulus connect the electrical current of the supply.

3. The device of claim 1, wherein the switch is configured to disconnect the electrical current of the reception, and based on the stimulus connect the electrical current of the reception, and wherein the switch comprises a mains switch.

4. The device of claim 1, wherein the predetermined timing function is set by a manufacturer of the device.

5. The device of claim 1, further including opening device configured to open the switch based on the control unit.

6. The device of claim 1, further including closing device for closing the switch for starting the current supply, and wherein the stimulus is configured to the closing device so as to close the switch.

7. The device of claim 6, wherein the closing device comprises mechanical closing device.

8. The device of claim 6, wherein the closing device comprises a magnetic closing device.

9. The device of claim 6, wherein the closing device comprises capacitive closing device.

10. The device of claim 1, wherein the control unit comprises a measuring device for measuring the electric current supplied by the supply and for operating the switch when the supplied electric current falls below a preselected threshold value.

11. The device of claim 1, wherein the control unit comprises a measuring device which provides measurement data, wherein the device comprises a timing function stopping device for changing the preselected timing function automatically based on the measurement data.

12. The device of claim 1, wherein the device comprises a detector for identification of successive operating times and for control of illuminating device on that basis.

13. The device of claim 1, wherein the housing comprises a detachable housing which is configured replaceable by another attachable housing having a different shape than the detachable housing.

14. The device of claim 1, wherein the housing is configured transparent at least over a portion of the housing, and the device further including an illumination device configured to illuminate the housing.

15. The device of claim 1, wherein the illumination is configured to illuminate the housing by two different colors, wherein control unit is configured to control the color on a basis of the predetermined timing function.

16. The device of claim 1, wherein:
the housing is further configured to be transparent at least over a portion of the housing;
and further including a LED night light configured to illuminate the housing, wherein the control unit is configured to control the LED night light for illuminating the housing on a basis of the predetermined timing function.

17. The device of claim 16, further including a battery, wherein the battery is configured to power the LED night light.

* * * * *